United States Patent [19]

Wood et al.

[11] 3,911,488

[45] Oct. 7, 1975

[54] METHOD AND APPARATUS FOR SYNCHRONIZING RECORD/REPRODUCE TRANSPORTS

[75] Inventors: Tracy G. Wood, San Jose; Erik O. J. Salbu, Los Altos, both of Calif.

[73] Assignee: Ampex Corporation, Redwood City, Calif.

[22] Filed: Apr. 24, 1974

[21] Appl. No.: 463,474

Related U.S. Application Data

[63] Continuation of Ser. No. 290,428, Sept. 19, 1972, abandoned, which is a continuation of Ser. No. 79,815, Oct. 12, 1970, abandoned.

[52] U.S. Cl. .................... 360/71; 318/314; 360/73; 360/91

[51] Int. Cl.² ........................G11B 15/52; G11B 15/26; G11B 15/44; G11B 19/24

[58] Field of Search ............... 360/71, 69, 73, 74, 8, 360/25, 27, 91; 318/314; 307/269; 328/133–134

[56] References Cited

UNITED STATES PATENTS

| | | | |
|---|---|---|---|
| 3,192,509 | 6/1965 | Durand | 360/72 |
| 3,400,317 | 9/1968 | Thomas | 360/71 |
| 3,408,549 | 10/1969 | Shimabukuro | 318/314 |
| 3,441,342 | 4/1969 | Ball et al. | 360/71 |

*Primary Examiner*—Alfred H. Eddleman

[57] ABSTRACT

In the operation of magnetic tape record/reproduce transports, a system is described for synchronizing the record/reproduce rates of at least two tapes at preselected and addressable signal storage locations thereon, each tape being carried by a different transport. In particular, a forward-backward counter is employed to monitor the time or phase separation between the selected storage locations associated with each transported tape and a digital-to-analog converter responsive to such counter is arranged to advance the signal transfer rate of one of the transported tapes while simultaneously retarding the signal transfer rate of the other tape so that the desired signal storage locations approach alignment. The differential advancement and retardation of the respective transports is gradually reduced to a level at which both transports are operated at equal and standard record/reproduce rates as the selected signal locations on the respective tapes assume alignment condition.

11 Claims, 1 Drawing Figure

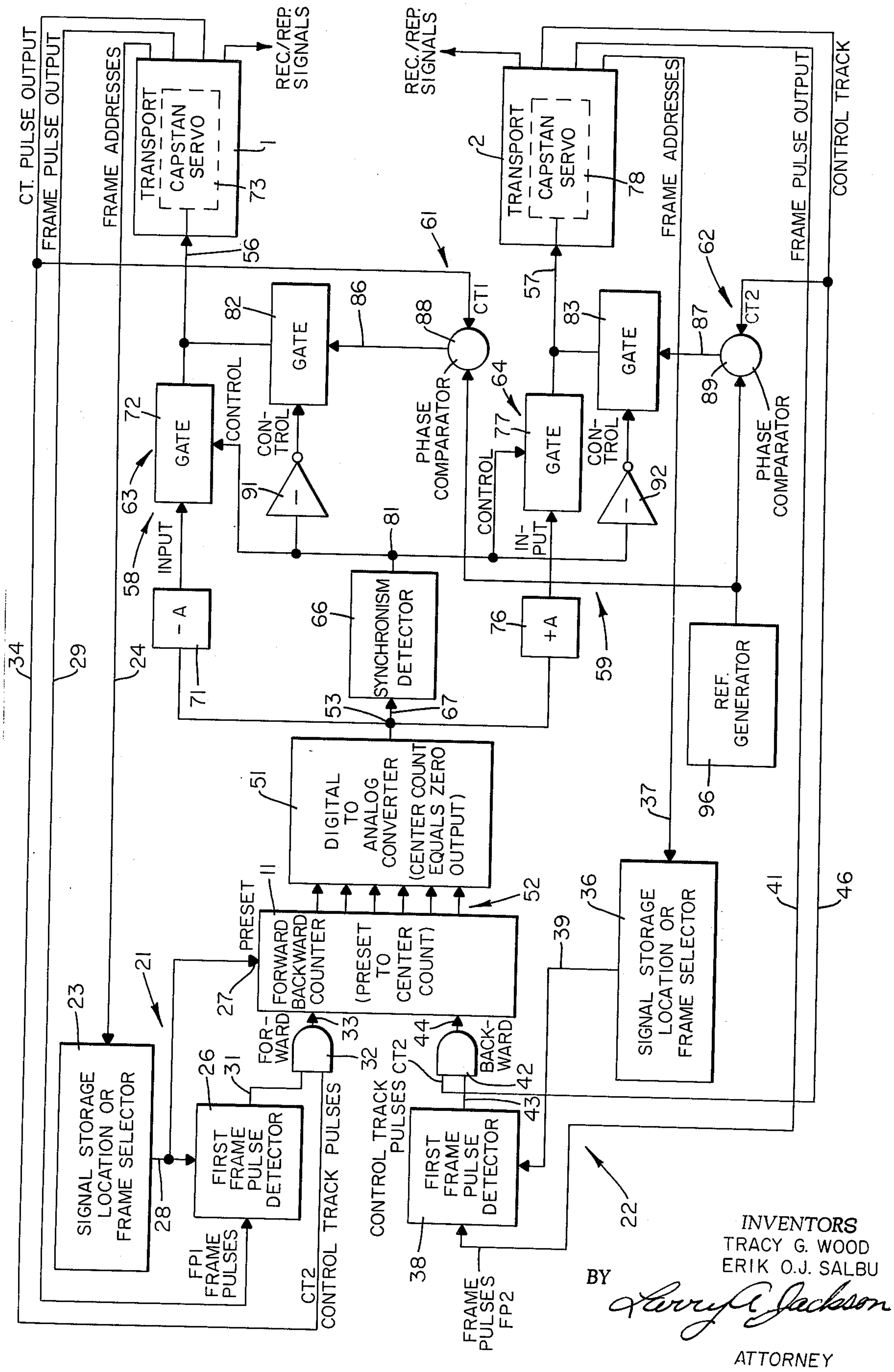
INVENTORS
TRACY G. WOOD
ERIK O.J. SALBU
BY [signature]
ATTORNEY

METHOD AND APPARATUS FOR SYNCHRONIZING RECORD/REPRODUCE TRANSPORTS

This application is a continuation of copending application Ser. No. 290,428 filed Sept. 19, 1972, now abandoned, which was a continuation of a copending application Ser. No. 79,815 filed Oct. 12, 1970 now abandned.

The present invention relates generally to systems for synchronizing two or more signals each located on a different storage medium, such as a magnetic tape, carried by an associated record/reproduce transport. More particularly, the invention concerns the synchronization of record or reproduce signals at selected storage locations on each of the record mediums.

The preferred embodiment of the invention will be described with respect to magnetic tape record systems; however it will be readily appreciated that the concepts of the present teaching may be applied to other signal storage equipment, for example, magnetic disc recorders. Special utility of the present invention is found in connection with systems where the information to be stored on the recording equipment is handled in units or segments of information, each segment adapted to be stored and retrieved from an addressable location on the magnetic tape. An example of this mode of operation is found in a system designed to store visual information by means of video tape recording equipment such as the system developed and produced by the Ampex Corporation of California. In the use of that system, it is many times desirable or necessary to enter or store a printed document onto two or more video tapes, such as a master tape and current file tape. According to known recording methods, it would be necessary to first record the document onto the master tape at a predetermined storage location and thereafter as a separate operation make the same recording onto a desired storage location of the current file video tape. However, if it were feasible to synchronize a pair of transports, one carrying the master tape and the other the file tape, such that these two recording operations could be performed simultaneously, the time-savings in terms of system time and operator's time, would be highly beneficial.

Similar advantages could be realized in the retrieval of associated information segments from a plurality of tape storage locations, wherein portions of the recorded information are stored on different tapes, each carried by a separate transport. In the retrieval of a set of associated information segments, it would be desirable to synchronize the reproduce rate of one of the transports at a particular tape storage location with the reproduce rate of another transport at the selected storage location on its associated tape. Thus, reproduction of the information could be effected in a smooth continuous operation with the reproduced information appearing as though coming from the same tape. Such an operation would be in contrast to the heretofore cumbersome technique of pre-positioning the tapes of different transports to a preselected point upstream from the addressed storage locations and first synchronizing one of the transports and reproducing the information segment associated therewith, and thereupon synchronizing the second transport so as to reproduce its associated information segment. The disadvantage of this latter scheme resides in the occurrence of a time delay between the termination of the first reproduced information segment and the start of the next segment caused by a required changeover in the synchronization of the first to the second transport. Furthermore, the advantages which would flow from the above described mode of operation are not limited to video signal storage systems. Substantial time-savings can be equally realized where the signals are of digital format and are recorded in multibit words (or the like) at addressable locations on the tape.

Accordingly, it is an object of the present invention to provide an improved system for synchronizing the record/reproduce rates of a pair of transports with respect to predesignated storage locations on each storage medium carried by the separate transports. For example, in connection with the storage of video images in a document storage and retrieval system wherein certain pages of a document are stored on one video tape and where the remaining pages of the same document are stored on a different video tape, the present invention provides for synchronizing the respective transports carrying these tapes at the proper tape address locations such that the document pages are reproduced in a continuous uniform sequence. Synchronization of the pair of transports is effected by measuring the relative positions of the selected tape storage locations in each transport and advancing the rate of one transport while simultaneously retarding the rate of the other transport until the desired storage locations approach alignment. At this point, the rate advancing and retarding functions are switched out and the rate and phase of the transports are jointly synchronized to a common reference signal. A forward-backward pulse counter is employed to monitor the relative displacement of the desired tape storage locations. With the counter preset to a center counting state, circuitry is provided for sensing the first selected storage location signal to be reproduced by the respective tape transports. Thereupon, control track pulses from the associated tape are fed into one side of the forward-backward counter to initiate counting in one direction relative to the center counter state. When the predesignated storage location signal from the second transport appears, circuitry provides for passing control track pulses from that transported tape to the other side of the forward-backward counter so as to counteract the count accumulation associated with the first transport. A digital-to-analog converter is responsive to the instantaneous level of the counter and provides an analog rate control signal having an amplitude and polarity employed for simultaneously advancing one transport and retarding the other in the proper sense to bring the two desired tape storage locations into synchronization. As the magnitude of this analog rate control signal decreases, indicating that the state of the counter is again approaching its center count level, the rates of the respective transports are brought correspondingly closer to the normal or standard record/reproduce rate. When the counter resumes its center count for a sufficient period of time, the rate control signals from the digital-to-analog converter are disabled and the transports are controlled by a standard reference signal with the desired storage locations on the tapes properly aligned.

A related tape transport synchronizing system is disclosed in copending application for U.S. patent Ser. No. 11,473, for a "Rapid Frame Synchronization of Video Tape Reproduce Signals" by Harold V. Clark and Gary B. Garagnon, filed Feb. 16, 1970, now U.S. Pat. No. 3,643,012, and assigned to the assignee of the present application. In that system, the off tape video frame rate is synchronized to a reference frame rate by employing a digital pulse count of off tape control track pulses and a train of reference pulses of corresponding periodicity and converting the accumulated digital count to an analog signal for controlling the tape rate of the transport. A rapid start-up synchronization for the video tape frame rate is thus achieved, wherein the particular frame at which the off tape signal becomes synchronized to the reference signal is not critical.

These and other objects, features and advantages of the invention will become apparent from the following description and the accompanying drawing illustrating the preferred embodiment of the invention.

The single drawing is a detailed block diagram of circuitry arranged and operating in accordance with the present invention to provide for synchronization of a pair of record/reproduce transports with selected tape storage locations aligned.

With reference to the drawing, the present invention provides for synchronizing the record/reproduce rates of a pair of transports 1 and 2 with selected signal storage locations or addresses prerecorded on the storage mediums carried by the respective transports aligned.

In this instance, each of transports 1 and 2 carries a magnetic tape (not shown) having a magnetic record format in which the information signals are disposed in discrete groups or segments and provided with prerecorded and addressable storage location signals. Each transport may be operated in a search mode to position the magnetic tape for recording or reproduction of any selected such address. For the present embodiment of the invention, the grouped information is recorded by means of magnetic heads rotating in a plane transverse to the direction of tape movement such that the tracks are substantially transverse to the tape length. Each information segment may correspond for example to a single frame of video information, in which case each storage location carries a frame pulse and a frame address identifying the start of that particular video frame, whether or not that location has actually been used. In addition, each tape is provided with a control track in the form of a magnetic track extending longitudinally with the tape and carrying a periodic pulse signal to be used in a feedback mode for maintaining the transport rate at a steady and desired level. A record format such as this is employed in the document storage and retrieval system developed and manufactured by Ampex Corporation, the assignee of the present invention. However, the advantages of the present invention are applicable to other types of signal information and recording equipment. For example, in some known systems, the video information referred to above is replaced by digital information which is similarly stored in segments or grouped bits or words. Each such digital segment is stored at an addressed tape position and is associated with a prerecorded pulse signal identifying the start of the segment in the same manner that the frame pulse mentioned above identifies the start of each video frame.

In general, as illustrated by the drawing, when the system is commanded to synchronize any given pair of frames or storage locations, each associated with one of the tape transports 1 and 2, control track pulse information developed off tape from each of the transports is utilized to monitor the relative positions of the selected frame locations. This operation is effected by a forward-backward counter 11 responsive to a switching and detection circuit 21 associated with transport 1, and a switching and detection circuit 22 associated with transport 2, each circuit being operative to pass control track pulses from the respective transports to different inputs of counter 11. Counter 11 thereupon assumes a count condition representative of the phase difference between, i.e., number of storage locations separating alignment of the selected storage locations carried by the respective tapes in a manner described in greater detail herein.

Circuit 21 includes a frame selector 23 for detecting a selected one of the frame address signals received from transport 1 over a line 24. In response to the occurrence of the desired frame address, a frame pulse detector 26 and a preset input 27 of counter 11 are actuated over an output line 28 from selector 23. This operation causes counter 11 to assume a preset counting level, preferably near the center of the counting range. In this instance the counter is preset to a count of 31 with the counter having a 64 bit binary range. At the same time, detector 26 is enabled to respond to the occurrence of the next frame pulse which thus identifies the start of the selected frame off tape from transport 1. The frame pulses FP1 are received by detector 26 over a line 29 from the transport. The combination of frame selector 23 and pulse detector 26 thus serves to sense the beginning of the desired frame on the tape of transport 1 and in response thereto detector 26, by means of an output line 31, enables a gate 32 to transmit control track pulses, CT2, to a forward input 33 of counter 11, where the control track pulses are received by gate 32 over a line 34 from transport 1. Accordingly, a reference time is established for the selected storage location or frame signal from transport 1 by accumulating control track pulses in a forward direction in counter 11 starting from the preset center count condition.

Referring to circuit 22, a similar arrangement of components is employed for initiating a control track pulse count off tape from transport 2 in response to the occurrence of a selected signal storage location or frame thereon. Here, a frame selector 36, functioning in response to a given selected frame location, senses the occurrence of a matching address from the address signals issued over a line 37 from transport 2 and in response thereto enables a frame pulse detector 38 over a line 39 to detect the first succeeding frame pulse to be issued from transport 2 over line 41. A gate 42 is accordingly actuated via an output line 43 of detector 38 to pass off tape control track pulses from transport 2 to a backward input 44 of counter 11 in response to the occurrence of the frame pulse associated with the selected frame location. The control track pulses are developed on an output line 46 extending between transport 2 and an input to gate 42 as shown.

Accordingly in operation, the selected frame or storage location associated with transport 1 is used as a reference, where counter 11 begins counting in a forward direction off the preset center count state and continues in this mode until the occurrence of the desired storage location or frame address associated with transport 2. Whereupon, control track pulses from transport 2 are fed into counter 11 at input 44 so as to decrease the rate or reverse the direction at which counter 11 is advancing in response to control track pulses from transport 1. The instantaneous state of counter 11 at and following the occurrence of the frame pulse associated with transport 2 represents the phase or position relationship between the respective tape frame locations.

A digital-to-analog converter 51 is employed to develop proportional rate control signals in response to the state of counter 11 for driving the pair of transports toward and into synchronization with the desired tape storage addresses aligned. For this purpose, converter 51 is connected to receive the plurality of bit outputs 52 from counter 11 and to develop an analog control signal at an output junction 53. Such analog signal has a magnitude proportional to the phase or position difference between the selected tape addresses and a polarity representing the sense in which such phase difference occurs, i.e., whether the selected address associated with transport 1 leads or lags the selected tape address of transport 2. The analog control signal generated at junction 53 is extended to rate control inputs 56 and 57 respectively of transports 1 and 2 through separate circuit paths 58 and 59, one of which includes a polarity or phase inversion so as to adjust the rates of the transports in opposite senses in response to the output of converter 51. So long as the selected tape storage locations associated with transport 1 and 2 remain out of synchronization, the transport rates are controlled by the output signal of converter 51 as described. However, when a synchronized condition has been attained, rate control inputs 56 and 57 are disconnected from the output of converter 51 and are connected to be controlled by standard reference rate control circuits indicated at 61 and 62. To accomplish this changeover in the rate control mode, switching means indicated at 63 and 64 are jointly responsive to a synchronism detector 66 having an input 67 connected to junction 53. Detector 66 functions to sense a zero magnitude output at junction 53 and operate switching means 63 and 64 in response thereto.

Considering the response of transports 1 and 2 to the condition of counter 11, as above mentioned counter 11 is initially preset to a center count state which in this instance corresponds to counting state 31. Digital-to-analog converter 51 is designed such that its output at junction 53 develops an analog signal having a magnitude proportional to the number of counting states that the counter is offset from the center count of 31. The polarity of the signal at junction 53 corresponds to the direction in which such offset count occurs relative to the center count. For example, assume that the pulse counting operation of counter 11 has been activated first in response to a selected frame pulse off tape from transport 1 and subsequent thereto in response to a selected frame pulse from transport 2. For the interval between such pulses, counter 11 has accumulated control track pulse counts in a forward direction in response to forward input 33, such that when the frame pulse associated with transport 2 arrives, counter 11 is a certain number of count states off the center count 31 in the forward direction. In this condition, converter 51 develops a control signal having a magnitude corresponding to the number of off center counter states and a polarity indicating that the desired tape storage location associated with the tape transport 1 leads the selected frame location associated with the tape of transport 2. This analog control signal is passed through circuit 58 which includes a polarity inversion, here in the form of an inverter amplifier 71, through a controlled gate 72 to input 56 of transport 1 directing the transport to slow down by an amount proportional to the amplitude of the control signal. In this instance, the rate adjustment is effected by capstan servo 73 incorporated within transport 1 and driving the magnetic storage tape. In this manner, the phase or position of the selected storage address associated with transport 1 is effectively retarded in response to the output of converter 51.

Simultaneously with the passage of the control signal through circuit path 58, the control signal is fed through circuit path 59, however in the latter instance without polarity inversion. Circuit path 59 here includes an amplifier 76 (having its input and output in phase), and a controlled gate 77 selectively communicating amplifier 76 with input 57 of transport 2. The magnitude of the control signal is the same in path 59 as in path 58, however the signal polarities are opposite. A capstan servo 78 of transport 2 is responsive to the signal at input 57 to advance the tape rate by an amount proportional thereto. In this manner, the tape rate of transport 2 is advanced by the same amount that the tape rate associated with transport 1 is retarded.

Due to the differential rate advancement and retardation of the respective transports, the control track pulse rate associated with transport 2 and applied to the backward input 44 of counter 11 soon exceeds the control track pulse rate associated with transport 1 and applied to counter input 33. Thereupon, the instantaneous state of counter 11 begins to recede from its far forward condition back toward the center count state. As the counter state changes, the magnitude of the converter output signal at junction 53 decreases toward zero and the differential advancement and retardation of transports 1 and 2 is gradually reduced such that the tape speeds converge toward equal and standard record/reproduce rates.

It may happen that a rapid differential speed change in the transports causes the tape rates to pass through synchronization in which case transport 2 would assume the lead relative to transport 1. If this occurs, the counter state would pass from the forward direction through center count toward the backward counter levels such that the polarity of the rate control signal at junction 53 passes through zero and assumes the opposite polarity to provide an appropriate adjustment of the transport rates.

Assume however, that counter 11 gradually steps toward its center counting state so that the tape rates are slowly brought into a stable synchronized condition. Synchronism detector 66 senses at its input 67 the zero condition of the output signal from converter 51 and in response thereto generates a switching function signal at an output 81. Responsive thereto, gates 72 and 77 are opened to block the passage of signals between amplifiers 71, 76 and inputs 56, 57 respectively; while gates 82 and 83 are simultaneously closed to connect rate control inputs 56 and 57 to the outputs 86 and 87 of phase comparators 88 and 89 respectively. The pair of gates 72 and 82 are operated in opposite senses (one being opened while the other closed and vice versa) by means of a control logic inverter 91 connected in the gate control circuit associated with gate 82. Similarly, a logic inverter 92 is connected in the control circuit of gate 83, such that gates 77 and 83 are operated in opposite senses in response to the switching signal developed at output 81.

Outputs 86 and 87 of phase comparators 88 and 89 respectively, develop control signals in response to a reference generator 96 for operating the transports at a nominal tape rate and phase. In particular, generator 96 develops a reference signal which is jointly fed to one input each of comparators 88 and 89 and whereupon it is compared with the control track pulse signals CT1 and CT2 issued by the respective transports. Outputs 86 and 87 thus control transports 1 and 2 respectively wherein the associated tapes are driven at rates at which the off tape control track signals match the reference signal from generator 96.

Once the tapes are synchronized to the desired pair of frame addresses, they may be operated jointly in continued synchronization at that particular tape phase relationship. When it is desired to synchronize different storage locations on the respective tapes, the operations described above are repeated for the new addresses or frame locations.

It will be appreciated that in the operation of the present invention with rotary scan magnetic tape transports, such as the type referred to above for recording video and certain digital signals, the longitudinal tape rate is not necessarily related to the transfer rate of the information signal which is recorded along magnetic tracks transverse or angulated relative to the tape length. The functioning of these transports is such that the rotation of the magnetic heads determines the record/reproduce signal transfer rate while the longitudinal tape movement provided by the capstan drive merely positions the tape in a proper phase relation to the rotating transducers. Thus, where the information signal is recorded in segments or frames, the tape must be advanced to a proper position upstream from the desired frame address and thereupon driven at a standard tape rate so that the magnetic tracks corresponding to the desired information signal are disposed in phase with the rotating heads. To achieve this operation, the usual technique is to record a signal indicating the start of the information segment onto a longitudinal control track such that the tape may be properly positioned by monitoring only the longitudinal control track. The signal indicating the start of the addressed storage location may be a frame pulse identifying the start of a video frame. Accordingly, in association with the present invention, the tapes are driven during the synchronization mode at rates which are respectively advanced and retarded relative to the normal tape speed so that certain of the information frames or frame locations are driven passed the rotating head assembly out of phase synchronism therewith. Upon approaching synchronization of the desired frame addresses and the longitudinal tape speeds returning to a standard rate, the transverse information tracks again become phase synchronized with the rotating magnetic heads so as to permit proper recording or reproducing of the signal information at the selected tape storage location.

What is claimed is:

1. In a method of controlling the drives of a pair of transports each for moving a storage medium carrying recorded storage location signals and each having control signals associated therewith from which the rate at which its storage medium is moved can be determined wherein the transports are operated to provide the associated control signals and to reproduce the storage location signals for synchronizing the record/reproduce rates of the transports while the storage media are relatively positioned to align selected storage locations thereof, the steps comprising:

establishing a reference indicative of the synchronized record/reproduce rates of the transports with the selected storage locations aligned;

comparing to said established reference the control signals provided by one of the transports in response to the reproduction of storage location signals of the storage medium moved thereby;

comparing to said established reference the control signals provided by the other transport in response to the reproduction of storage location signals of the storage medium moved thereby;

generating a representation of the record/reproduce rates of the transports and alignment of the storage locations in response to said comparisons;

commanding the transports simultaneously in response to said generated representation to cause both to move their respective storage media in accordance with said generated representation; and adjusting the commanding of the transports simultaneously in opposite phase senses when said generated representation indicates a lack of synchronization of the record/reproduce rates of the transports and alignment of selected storage locations to cause one of the transports to move its storage medium at a rate greater than the synchronized rate and the other to move its storage medium at a rate less than the synchronized rate.

2. The method as defined in claim 1 wherein a preset signal level is established as the reference; the comparison steps include changing the preset signal level in one sense in accordance with the control signal provided by one of the transports in response to the reproduction of storage location signals of the storage medium moved thereby, and changing the preset level in the reverse sense in accordance with the control signal provided by the other transport in response to the reproduction of storage location signals of the storage medium moved thereby; the representation generating step includes generating a resultant signal level from said changes as the representation of the record/reproduce rates and alignment of storage locations, and the simultaneous commanding step includes generating drive signals for each of the transports in response to said resultant signal level.

3. The method as defined in claim 2 wherein the preset signal level is a midrange count established by a reversible pulse counter; the comparison steps include coupling to the reversible pulse counter the control signal provided by the first transport to change the counting state of the counter in one direction in response to the reproduction of storage location signals of the storage medium moved by said first transport and coupling to said counter the control signal provided by the second transport to change the counting state of the counter in an opposite direction in response to the reproduction of the storage location signals of the storage medium moved by said second transport; and the simultaneous commanding step includes detecting the instantaneous count level of said counter, and commanding said transports to transport the storage media at equal rates when said count level is within the midrange count state and to transport the storage medium of one of the transports at an advanced rate and the storage medium of the other transport at a retarded rate when said count level is to either side of said midrange count state, said advanced and retarded rates depending on the direction and magnitude of the count level relative to said midrange state.

4. The method as defined in claim 3, further comprising the step of detecting the occurrence of said midrange count state on said counter and in response thereto synchronizing the record/reproduce rates of both said transports to a reference timing signal.

5. The method as defined in claim 3 wherein said counter has a digital output and further comprising, the step of converting such digital output from said counter into an analog control signal having a magnitude and polarity representing the number of counting states and direction in which the instantaneous counting state is offset from said midrange state for controlling the record/reproduce rates of said transports in accordance therewith.

6. The method as defined in claim 5 wherein said transports each have a servo input for receiving a rate control signal and further comprising, the steps of passing said analog control signal over separate circuit paths to said transport servo inputs and inverting the phase polarity of said analog signal in one of said paths to provide for controlling the transport rates in opposite phase senses.

7. The method defined in claim 6 further comprising, the steps of developing a reference timing signal for operating both said transports at a preselected record/reproduce rate, detecting the occurrence of said midrange counting state and in response thereto interrupting said circuit paths carrying said analog control signals to said transport inputs and connecting said reference timing signal to said transport inputs.

8. The method defined in claim 1 further comprising the steps of developing a reference timing signal for controlling both of said transports to be operated at a preselected record/reproduce rate, and detecting the occurrence of synchronization between the record/reproduce rates of said transports to cause said transports to be controlled by said reference timing signal.

9. A system for controlling a pair of transports each moving a storage medium carrying recorded storage location signals thereon and each providing control signals at a rate according to the rate of transport of the medium moved thereby to simultaneously align a selected storage location of one of the media relative to a selected storage location of the other and synchronize the record/reproduce rates of the transports with the selected storage locations aligned, comprising:

separate electrical signal detector means associated with each transport for detecting storage location signals reproduced from the medium moved by its associated transport;

forward-backward counter means having a preselected count state serving as a reference indicative of the alignment of storage locations and synchronization of record/reproduce rates, said counter counting in a forward direction in response to pulses received at a first input and counting in a backward direction in response to pulses received at a second input;

gating circuit means connecting the first input of said counter means to receive pulses derived from the control signal provided by a first of said transports in response to the detection of storage location signals by the detector means associated therewith and connecting the second input of said counter means to receive pulses derived from the control signal provided by a second of said transport in response to the detection of storage location signals by detector means associated therewith; and digital-to-analog converter means connected between said counter and both of said transports and being responsive to count states to one side of said preselected count state to advance the rate of transport of the medium by the first transport and simultaneously retard the rate of transport of the medium by the second transport and being responsive to count states to the other side of said preselected count state to retard the medium transport rate of said first transport and simultaneously advance the medium transport rate of said second transport.

10. The system as defined in claim 9, wherein each of said transports has a rate control signal input and further comprising, a reference signal means for controlling said transports at a preselected medium transport rate, switching circuit means selectively and alternately connecting either said converter means or said reference signal means to said transport rate control signal inputs, and synchronism detector means connected to and operating said switching means in response to said counter means assuming said preselected count state to dispose said switching means in a condition connecting said reference signal means to said transport rate control signal inputs for operating said transports to move the associated media at said preselected transport rate.

11. The system as defined in claim 9, wherein said converter means has an output for connection to said transports issuing an analog signal having an amplitude and polarity representing the instantaneous count state relative to said preselected count state, and further comprising, polarity inverter means connected between said converter output and one of said transports to provide for controlling advancing the medium transport rate of one transport while simultaneously retarding the medium transport rate of the other in response to the same output signal from said converter means.

* * * * *